United States Patent
Moss et al.

[19]

[11] Patent Number: 6,128,193
[45] Date of Patent: Oct. 3, 2000

[54] ENHANCED HUMIDITY CONTROL FOR SMALL MODULES

[75] Inventors: John Seaborn Moss; John Watkins, both of Ottawa; Michal Stefan Tencer, Nepean; Richard Pierre Hughes, Kanata, all of Canada

[73] Assignee: Nortel Networks Corporation, Montreal, Canada

[21] Appl. No.: 09/082,476

[22] Filed: May 21, 1998

[51] Int. Cl.[7] .............................. H05K 5/06; H05K 5/02
[52] U.S. Cl. .......................... 361/729; 174/50; 174/52.3; 174/59; 439/271; 439/928; 379/330; 379/437; 379/440; 455/349
[58] Field of Search .................................. 361/728–736, 361/746, 747; 174/52.1, 52.3, 17.08, 37, 50, 59, 60, 65 R; 439/76.1, 76.2, 271, 278, 281, 282, 283, 928, 928.1; 379/325, 328, 329, 330, 428, 429, 437, 440; 455/89, 90, 128, 347, 348, 349, 351; 220/4.02

[56] References Cited

U.S. PATENT DOCUMENTS

| 4,350,508 | 9/1982 | Santoro et al. | 96/117.5 |
| 5,244,707 | 9/1993 | Shores | 428/76 |
| 5,548,643 | 8/1996 | Dalgleish et al. | 379/429 |
| 5,747,734 | 5/1998 | Kozlowski et al. | 174/50 |

*Primary Examiner*—Jeffrey Gaffin
*Assistant Examiner*—John B. Vigushin

[57] ABSTRACT

The present invention relates to two modules containing electronic equipment, one relatively small, and one relatively large, that will be physically connected and used for extended operation in an environment where the ambient atmosphere contains moisture filled air or some other specified environmental contaminant. An absorber such as desiccant of a prescribed amount is contained within at least the relatively large module to control the absolute humidity and/or environmental contaminants within each module during extended operation in the ambient environment. Permeable wall portions are placed in the region between the relatively small module and the relative large module to allow for moisture and/or other specified environmental contaminants to pass from the relatively small module to the relatively large module. As such, the lifespan of the small module can be extended.

22 Claims, 6 Drawing Sheets

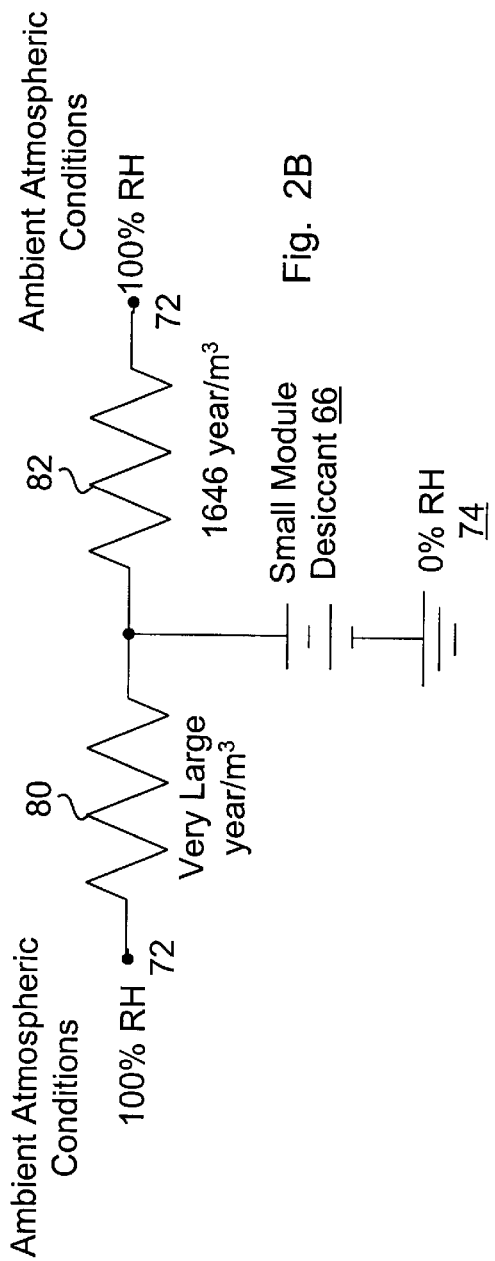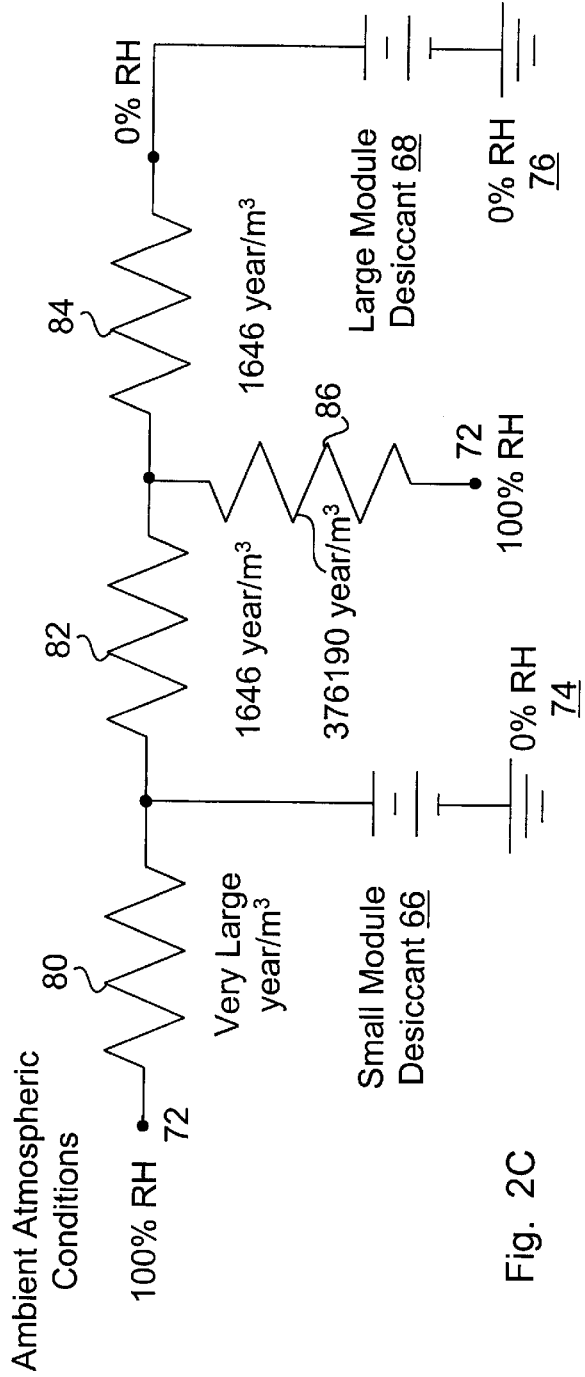

ENHANCED HUMIDITY CONTROL FOR SMALL MODULES

FIELD OF THE INVENTION

The present invention relates to electronic packaging, and in particular to electronic packaging that provides enhanced humidity and/or environmental contaminant control for small modules.

BACKGROUND OF THE INVENTION

New developments in telecommunication technology will require the bulk of telecommunication packaging to gradually shift from central office design to remote equipment design. This means that electronic packaging designers can no longer depend on a controlled atmospheric environment to ensure reliability of complex electronic systems. A very significant proportion of environment related reliability problems encountered by electronic packaging is either directly or indirectly related to atmospheric humidity. High humidity can give rise to the following effects: (i) degradation of thermal and electrical insulating materials, (ii) electrical shorts caused by condensation, (iii) oxidation and/or galvanic corrosion of metals, (iv) accelerated chemical reactions, (v) chemical or electrochemical breakdown of organic surface coatings, (vi) deterioration of electrical components, and others. It is therefore very important to provide design solutions for telecommunication packaging that provide for proper humidity management. As well, other environmental contaminants such as carbon dioxide may lead to shorter lifespans for electronic components.

One of the two basic approaches to humidity management of remote telecommunication equipment involves absolute humidity control (the other being relative humidity control). The idea behind relative humidity control is to maintain critical surfaces at a temperature higher than ambient by a constant $\Delta T$ (temperature), while at the same time ensuring fast equilibration of internal and external absolute humidities.

Absolute humidity control is generally used in the presence of backpanels or other unheated boards with electrical bias, with inadequate energy dissipation, with variable telecommunication traffic and when no servicing is expected. Absolute humidity control is characterized by (i) using a non-permeable (usually metal) enclosure, (ii) allowing absolutely minimal amount of plastic or rubber for cabling and gasketing, (iii) allowing no openings, and (iv) using a desiccant to absorb any water or water vapour which enters the enclosure.

The construction of perfect hermetically sealed telecommunication packaging is seldom possible since the various seals in such packaging usually exhibit small leakages to allow moisture from the ambient atmosphere to enter the enclosure. The imperfections of such packaging are further heightened in so-called semi-sealed enclosures (used only in connection with relative humidity control) that have deliberate openings for reception of connectors, pass-through cables, etc.

Remote telecommunications equipment is often characterized by modules (both large and small) that are mated together to create electrical, electronic or optical connections. The reason for minimizing the size of such small modules to the point where they can no longer contain enough absorber for an extended product life is to increase dependability during shipping, installation and maintenance. The prior art reveals that it is possible to construct large sealed enclosures with a sufficient supply of desiccant to protect the electronic equipment contained therein for its lifetime. For example, in Shores U.S. Pat. No. 5,244,707 there is described a method of maintaining a dry atmosphere in a container type sealed electronic package by incorporating a coating or adhesive of desiccant properties.

However, it has heretofore been difficult to ensure the life of electronic equipment contained within relatively small enclosures that are to be mated with other relatively larger enclosures. Once mated with a relatively larger enclosure, the diminished humidity control characteristics of such relatively small enclosures risk the viability of the electronic equipment enclosed within both enclosures.

A number of desiccant caps have been designed to provide a low humidity atmosphere within an associated container. For example, in Santoro U.S. Pat. No. 4,350,508, the desiccant cap comprises an enclosure having an internal cavity divided into two portions, the first of which is designed to accept and hermetically seal a container, and the second designed to accept and hold a mixture of desiccant and a humidity sensitive colour indicator. Though other desiccant caps may be designed for use with remote telecommunication equipment, the desiccant caps disclosed in Santoro U.S. Pat. No. 4,350,508 have no application for the protection of remote telecommunication equipment.

In Dalgleish U.S. Pat. No. 5,548,643 (related to relative humidity control) there is described an outdoor wireless base station having a housing and a circuit pack extending upwards in the housing with electronic components extending into a forward air flow passage. A humidity control device is used to minimize moisture problems within the housing by providing a moisture balance between the inside and outside of the housing. While useful for controlling relative humidity, this invention would not be applicable in an environment where absolute humidity is sought to be controlled, e.g., in small, low powered modules.

SUMMARY OF THE INVENTION

It is therefore an object of the present invention to provide a modular electronic system comprising: a relatively large module having walls defining an enclosure holding at least one first electronic component and contaminant absorber for absorbing a specific environmental contaminant, a major portion of the walls being formed of material which is non-permeable to the specific environmental contaminant, and a minor portion being formed of material which is permeable to the specific environmental contaminant; a first connector coupled to the at least one first electronic component and projecting out of the permeable wall portion of the relatively large module; a relatively small module having walls defining an enclosure holding at least one second electronic component, a major portion of the walls being formed of material which is non-permeable to the specific environmental contaminant, and a minor portion being formed of material which is permeable to the specific environmental contaminant; a second connector coupled to the at least one second electronic component and projecting out of the permeable wall portion of the relatively small module, the second connector being mateable with the first connector; and non-permeable sealant means providing a bridging seal between the non-permeable wall portion of the relatively small module and the non-permeable wall portion of the relatively large module in the vicinity of the first and second connectors when mutually mated, whereby the contaminant absorber in the large module removes the specific environmental contaminant from the relatively small module via the permeable wall portions of the relatively large and relatively small modules.

The present invention relates to two modules containing electronic equipment, one relatively small, and one relatively large, that will be physically connected and used for extended operation in an environment where the ambient atmosphere contains moisture filled air or some other environmental contaminant. If the contents of each module (hereinafter referred to as the "small module" and the "large module") were to be directly exposed to the ambient atmosphere, such contents would be liable to fail performing their intended function. Thus, the absolute humidity and/or other specified environmental contaminants must be controlled adjacent to the module contents within prescribed limits for the life of the modules.

The modules are constructed of a material that has low permeability to moisture and/or other specified environmental contaminants. As well, non-permeable seals are used at the bridging point of the small module and the large module. The contents of the small module and the large module can include, but are not limited to, electronic circuit boards and components, optical devices and electro-optical devices. Electrical or optical connections are used to join the small module to the large module. A cable or feed-through can optionally be fitted to either or both modules depending on the functionality required of the module(s). The feed-through is not limited to, but can include optic fibres and electrical wires.

An absorber such as desiccant of a prescribed amount is contained within both modules to control the absolute humidity and/or environmental contaminants within each module during extended operation in the outside environment. The quantity of absorber that is placed inside the small module is, due to its small size, insufficient by itself to ensure adequate module life during extended operation. However, the quantity of absorber inside the small module is sufficient to ensure reliable function when only a short period has elapsed between the manufacture, storage, transport and installation of the module. The quantity of absorber in the large module, due to its large size, is sufficient to control the absolute levels of humidity and/or environmental contaminant within both modules for the intended operating life of the modules.

The portions of the module walls and connector areas which exist in the sealed part of the interface between the two modules (the "region") perform the critical function of the invention in that such portions have a prescribed permeability to moisture and/or other specified environmental contaminants. While the permeability of such portions is high enough that moisture and/or other specified environmental contaminants can easily be transmitted from the small module internal volume to the large module internal volume where it can be absorbed by the absorbent in the large module, the permeability of such portions is low enough that the small amount of absorber can protect the module contents for the limited period of time prior to connection to the large module. The permeability of such portions is significantly higher than the bridging seals between the small and large module. As such, the lifespan of the small module can be extended.

BRIEF DESCRIPTION OF THE DRAWINGS

Preferred embodiments of the invention will now be described with reference to the attached drawings in which:

FIG. 2B is a circuit diagram representative of a resistance model for the small module before assembly to the large module;

FIG. 2C is a circuit diagram representative of a resistance model for the small module after assembly to the large module;

DETAILED DESCRIPTION OF THE PREFERRED EMBODIMENTS

Figure 1:
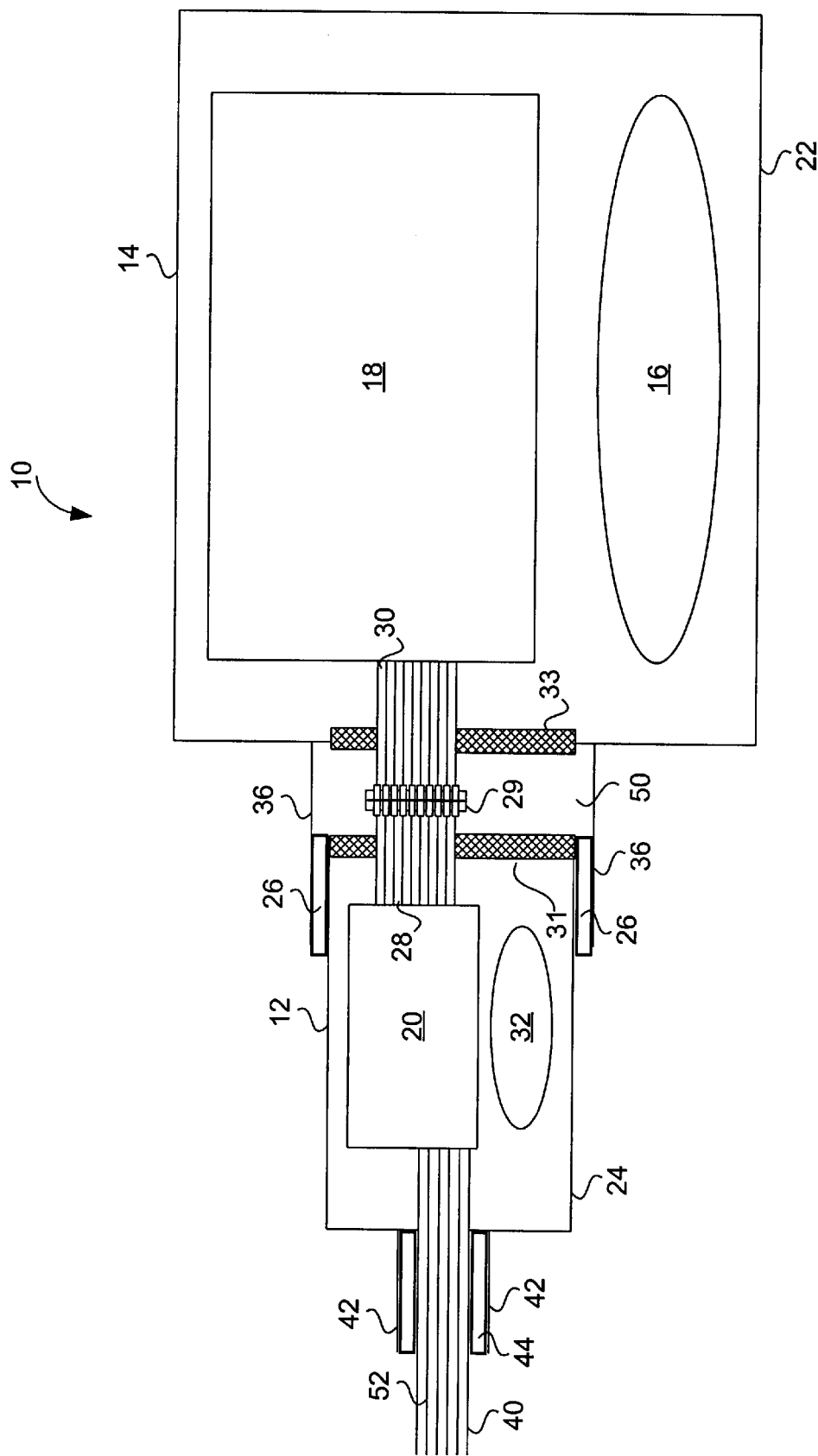
FIG. 1 is a schematic view of the modular electronic system of the present invention comprising a small module connected to a large module.

FIG. 1 is a schematic view of the modular electronic system 10 of the present invention comprising a relatively small module (hereinafter "small module") 12 connected to a relatively large module (hereinafter "large module") 14. The small module 12 and the large module 14 protect electronic components 18, 20 and connectors 28, 30 from contaminants in the ambient atmosphere, such as humidity, gases, etc. Any of these contaminants may affect the lifespan of electronic components 18, 20 and connectors 28, 30. Electronic components 18, 20 can comprise any variety of electronic circuits or microcircuits, including integrated microcircuits (silicon chips and dies), hybrid microcircuits, optical devices, electro-optical devices, and surface mounted devices used as transistors, diodes, resistors, capacitors, transducers, etc.

Large module 14 is formed as an enclosure defined by walls, a major portion of which is formed of non-permeable material and a minor portion of which is formed of permeable material. More particularly, one of the non-permeable end walls 22 has a central portion 33 which is formed of permeable material. The enclosure holds at least one electronic component 18, and absorber 16 of environmental contaminants. The quantity of absorber 16 in the large module 14 is selected to sufficiently control the absolute levels of contamination within both modules 12, 14 for the intended operating lifespan of the modules. Non-permeable walls 22 have a high resistance to diffusion of water vapour and/or other specified environmental contaminants, whereas permeable wall portion 33 has a relatively lower resistance to diffusion of water vapour and/or other specified environmental contaminants. Typically, non-permeable walls 22 are made of metal casting or a metal/plastic laminate, while permeable wall portion 33 would be made of polycarbonate or PBT polyester.

Where the environmental contaminant to be controlled is humidity, the absorber 16 comprises desiccant material, such as silica gel ($SiO_2$), drierite ($CaSO_4$) and activated alumina ($Al_2O_3$). However, a common drawback of the aforementioned desiccant materials is that when they are close to saturation at room temperature, they will release water when heated. Upon quick cooling, excess water may condense where it can do damage before it is reabsorbed by the desiccant. Therefore, the preferred desiccant material for use with the present invention is molecular sieves, i.e. synthetic alumino-silicates with cavities designed specifically to accommodate water molecules which maintain a very low equilibrium water vapour pressure even at high temperatures. In particular, molecular sieves with 4 Ångstrom cavity size (4A molecular sieves) are preferred for use in connection with the present invention. Examples of preferred synthetic molecular sieves include MOLSIV™ types 3 Å, 4 Å, 5 Å, SILIPORITE™, types 3 Å, 4 Å, 5 Å, and ZEOCHEM™, types 3 Å, 4 Å, 5 Å.

Non-permeable walls 36 project outwardly from non-permeable walls 22 of large module 14 at a location surrounding permeable wall portion 33 and defining an external junction 50 sized to accommodate small module 12. A connector 30 coupled to electronic component 18 projects out of permeable wall portion 33 of large module 14 into junction 50. Connector 30 may be an electrical or optical connector, depending on the type of electronic components contained in large module 14 and small module 12.

Like large module 14, small module 12 is formed as an enclosure holding at least one electronic component, the enclosure being defined by walls, a major portion of which is formed on non-permeable material and a minor portion of which is formed of permeable material. More particularly, all of the walls 24 are non-permeable except for an end wall 31 which is permeable. Non-permeable walls 24 have a high resistance to diffusion of water vapour and/or other specified environmental contaminants, whereas permeable wall 31 have a relatively lower resistance to diffusion of water vapour and/or other specified environmental contaminants. Typically, non-permeable walls 24 are made of metal casting or a metal/plastic laminate, while permeable wall 31 would be made of polycarbonate or PBT polyester. A connector 28, which is mateable with connector 30 (by the use of connector pins and sockets 29, the pins extending from connector 28 mateable with sockets extending from connector 30, or vice versa), is coupled to electronic component 20 and projects out of permeable wall 31.

For illustration purposes only, a gap is shown in external junction 50 between permeable wall 31 (of small module 12) and permeable wall portion 33. However, more typically, permeable wall 31 would be in mated contact with permeable wall portion 33 when small module 12 is connected to large module 14. As well, in practise, the thickness of permeable walls 31, 33 would be approximately the same thickness as non-permeable walls 22, 24. The greater thickness of permeable walls 31, 33 shown is merely to expose the permeable nature of the material making up these walls.

Though optional, an absorber 32 can be enclosed within small module 12 to ensure reliable function during the short period between the manufacture, storage, transport and installation of small module 12. However, the quantity of absorber 32 that is placed inside the small module is, due to its small size, insufficient by itself to ensure adequate module life during extended operation.

To aid the environmental protection of the contents of each module, seals 26 are fitted in junction 50 to sealingly engage non-permeable wall 24 of small module 12 to non-permeable wall 36 of large module 14. Without seals 26, practical long term use of the modules would be impossible. As it is expected that the connection between small module 12 and large module 14 will be made and unmade in the operating environment, seals 26 should be easily separable to avoid large operating cost penalties associated with the installation, maintenance and upgrade of the modules. The permeability of seals 26 is designed to be as low as possible. Acceptable sealants for use as seals 26 include butyl rubber, nitrile rubber, neoprene, isoprene, and filled silicone.

Depending on functional requirements, a cable or feed-through 40 can optionally be fitted to small module 12 or large module 14 (not shown). Cable or feed-through 40 can include, but is not limited to optic fibres and electrical wires which are connected to electrical component 20 through a junction region 52 defined by non-permeable walls 42 which project out of small module 12. Seals 44 (which are typically factory installed) are fitted in between non-permeable walls 42 and cable or pass-through 40 to aid the environmental protection of small module 12.

Permeable walls 31, 33 which form part of the interface between small module 12 and large module 14 perform the critical function of the invention in that these walls have a prescribed permeability to moisture and/or other specified environmental contaminants. On the one hand, the permeability of permeable walls 31, 33 is high enough that moisture and/or other specified environmental contaminants can easily be transmitted from small module 12 to large module 14 where it can be absorbed by absorbent 16, thus controlling the absolute moisture and/or contaminant levels within the small module 12. On the other hand, the permeability of permeable wall 31 is low enough that the small amount of absorber 32 within small module 12 can protect electrical component 20 for the period of time before connection to large module 14. The permeability of permeable walls 31, 33 is significantly higher than the permeability of seals 26, 44. By fitting small module 12 and large module 14 with non-permeable walls 31, 33 of desired permeability, the lifespan of electronic component 20 inside small module 12 can be increased.

Figure 2A:
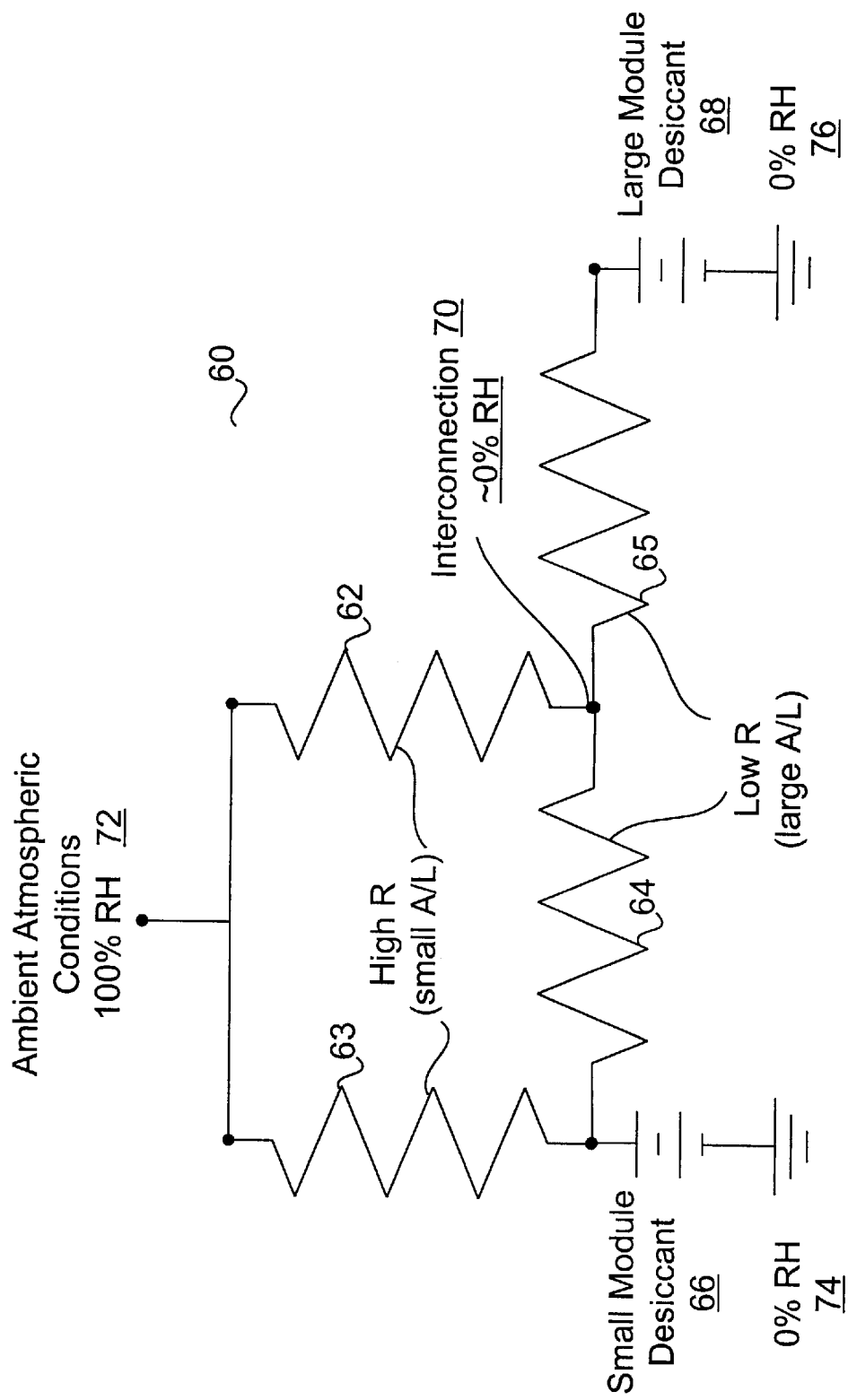
FIG. 2A is a circuit diagram representative of a resistance model of the present invention.

FIG. 2A is a circuit diagram representative of a resistance model 60 of the present invention. This drawing (as well as FIGS. 2B and 2C) uses an electrical circuit analogy for humidity or contaminant diffusion in which electrical resistance replaces resistance to diffusion, and rechargeable batteries replace desiccant. The electrical concept of resistance provides a good analogy for the rate of diffusion of humidity and/or other specified environmental contaminants across a seal, where resistance, R L/A, A being the cross-sectional area of the seal, and L being the depth or diffusion length of the seal.

Point 72 represents the ambient atmospheric conditions, assumed to be 100% relative humidity (RH). Resistors 62, 63 have a high resistance to diffusion of humidity and/or other specified environmental contaminants (i.e. a small ratio of A/L). Resistor 62 is representative of seal 26 shown in FIG. 1, whereas resistor 63 is representative of seal 44 shown in FIG. 1. Small module desiccant (representative of desiccant 32 in FIG. 1) is represented by rechargeable battery 66 connected to ground 74 which is representative of 0% relative humidity. Interconnection 70 (at approximately 0% relative humidity) separates resistors 64, 65 each having a low resistance to diffusion of humidity and/or other specified environmental contaminants. Referring back to FIG. 1, resistor 64 is representative of permeable wall 31, and resistor 65 is representative of permeable wall portion 33. Large module desiccant (see desiccant 16 in FIG. 1) is represented by rechargeable battery 68, which is connected to ground 76 at 0% relative humidity.

Resistance R can be calculated as (Equation 1)

$$R = \frac{1}{P(A/L)_{\textit{eff}}}$$

where P is the permeability of the sealant material ($cm^2s^{-1}$) and $(A/L)_{\textit{eff}}$ is the effective ratio of cross-section area of the seal to its depth of diffusion length (cm).

A similar calculation can be performed to calculate the amount of desiccant needed to protect an enclosure for required time $t_{des}$, as follows (Equation 2):

$$X = \frac{P(A/L)_{eff} C_a t_{des}}{f}$$

where X is the amount of desiccant (g), f is the efficiency of desiccant (assume f=0.1 for molecular sieves), and $C_a$ is the water vapour concentration (assume saturated vapour concentration of $39.5 \times 10^{-6}$ g/cm$^3$). The value of $C_a$ used is for a dewpoint of 34° C., the highest dewpoint encountered in nature.

Using the above formulas, resistance and quantity of desiccant can be calculated for two cases: (1) small module 12, before assembly to large module 14, and (2) small module 12 and large module 14 assembled together. The following calculations were performed based on a 20 year product life and 100% relative humidity (liquid water). Element numerals refer to FIG. 1.

Case 1: Assume permeable wall 31 (A/L)=π×0.5252/0.5= 1.73 cm, and P=$1.12 \times 10^{-5}$ cm$^2$/s [for polycarbonate material]. Persons skilled in the art will appreciate that the units (cm$^2$/s) for P of polycarbonate are not typically encountered for permeability (instead, cm$^2$/s is usually used for diffusion coefficient). The unit system employed herein is the one proposed by H. Yasuda, J. Appl. Polym. Sci., 19, 2529 (1975).

Using Equation 1, resistance R=1646 year/m$^3$. Since the ratio of (A/L) for seal 44 is so low, the resistance to diffusion of humidity and/or other specified environmental contaminants is so high at seal 44 as to have no more than negligible effect on the lifespan of small module 12. Using Equation 2, the total required amount of desiccant 32 is therefore calculated to be 4.8 g.

Assuming that the volume of small module 12 that can accommodate desiccant 32 is 0.28 cm$^3$, a lifespan for small module 12 can be calculated using Equation 1. Since the packing density of molecular sieves is typically 0.64 g/cm$^3$, the amount of desiccant 32 that can be accommodated is 0.28 cm$^3$×0.64 g/cm$^3$=0.18 g. Using Equation 2, $t_{des}$ would therefore be 9 months. Thus, small module 12 would have a lifespan of 9 months between the manufacture, storage, transport and assembly to the large module 14.

FIG. 2B is a circuit diagram representative of a resistance model for small module 12 before assembly to large module 14. Point 72 represents the ambient atmospheric conditions, assumed to be 100% relative humidity (RH). Resistor 80 is representative of seal 44 (in FIG. 1) having a very large resistance to diffusion of humidity and/or other specified environmental contaminants. Small module desiccant (representative of desiccant 32 in FIG. 1) is represented by rechargeable battery 66 connected to ground 74 which is representative of 0% relative humidity. Resistor 82 is representative of permeable wall 31 in FIG. 1 having a resistance to diffusion of humidity of 1646 year/m$^3$.

Case 2: The resistance of seal 26 can be calculated as follows, assuming a thickness of 0.05 cm. (A/L)=π×1.25 cm×0.05 cm=0.11 cm, P=$7.51 \times 10^{-7}$ cm$^2$/s. Using Equation 1, resistance=376190 year/m$^3$.

As for the diffusion flow of humidity between small module 12 and large module 14, the resistance for permeable walls 31, 33 can be calculated as follows: (A/L)=π×0.525$^2$/ (0.5×2)=0.865 cm, P=$1.12 \times 10^{-5}$ cm$^2$/s [for polycarbonate material]. Using Equation 1, total resistance is therefore 3292 year/m$^3$.

FIG. 2C is a circuit diagram representative of a resistance model for the small module after assembly to the large module. Point 72 represents the ambient atmospheric conditions, assumed to be 100% relative humidity (RH). As with FIG. 2B, resistor 80 is representative of seal 44 (in FIG. 1) having a very large resistance to diffusion of humidity and/or other specified environmental contaminants. Small module desiccant (representative of desiccant 32 in FIG. 1) is represented by rechargeable battery 66 connected to ground 74 which is representative of 0% relative humidity. Resistor 82 is representative of permeable wall 31 in FIG. 1 having a resistance of 1646 year/m$^3$. Resistor 84 is representative of permeable wall portion 33 in FIG. 1 having a resistance of 1646 year/m$^3$. When small module 12 is connected to large module 14, the total resistance to flow between the small module and large module is therefore 3292 year/m$^3$. Resistor 86 is representative of seal 26 (in FIG. 1) having a resistance to diffusion of 376190 year/m$^3$. Large module desiccant (see desiccant 16 in FIG. 1) is represented by rechargeable battery 68, which is connected to ground 76 at 0% relative humidity.

Figure 3:
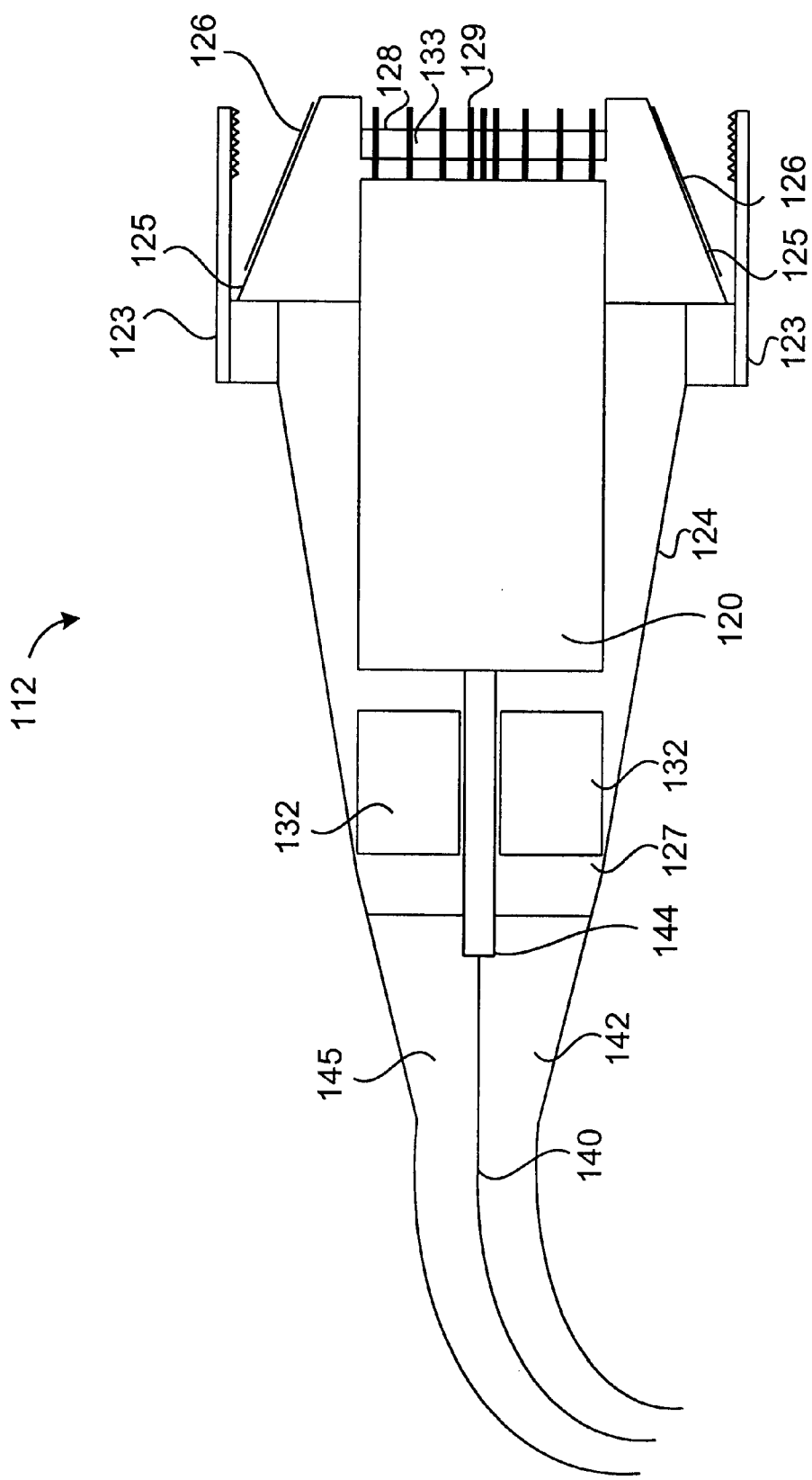
FIG. 3 is a top view of one embodiment of a small module that forms part of the modular electronic system of the present invention.

While the illustration of the invention shown in FIG. 1 is applicable to any shape and size of small module 12 and large module 14, FIG. 3 is a top view of one embodiment of a small module 112 that forms part of the modular electronic system of the present invention. Small module 112 contains a tapered (typically conical metal) interface 125 with a coating 126 of a suitably deformable plastic sealant material. A locking nut 123 or other clamping arrangement is provided at opposite ends of tapered interface 125 that will be used to mate with a suitably shaped tapered clamping receptacle 136 extending from a large module 114 (shown in FIG. 4).

Small module 112 also includes a metal enclosure 124 and support structure 127 holding an electronic component 120 and absorber 132. Metal enclosure 124, including tapered interface 125 and support structure 127 form a shell that is impervious to moisture and other specified environmental contaminants except at connector 128 (by the use of connector pins and sockets 129, the pins extending from connector 128 mateable with sockets extending from connector 130, or vice versa) at the front of the support structure 127. Small module 112 has permeable wall 131 having a relatively low resistance to diffusion, as compared to the resistance to diffusion of metal enclosure 124, and support structure 127.

At the rear of support structure 127 is tube 144 through which conductors or fibres 140 are passed. The annular space between the conductors or fibres 140 and a cable terminating assembly 142 is filled with a suitable plastic or adhesive sealant, such as epoxy. Tube 144 must be of minimal cross-sectional area and be of sufficient length. The adhesive or sealing material must be without excessive voids to prevent excessive contaminant diffusion into small module 112. Tube 144 must also be of adequate cross-sectional area and suitable proportion to avoid damage and unreliable insertion of cable conductors or fibres 140 into tube 144. A suitable strain relief 145 attaches the sheath of cable 140 to support structure 127 to prevent damage to the cable due to handling, e.g. from torsion, shear or bending stresses which might fracture tube 144 or cable fibres 140, in particular.

Figure 4:
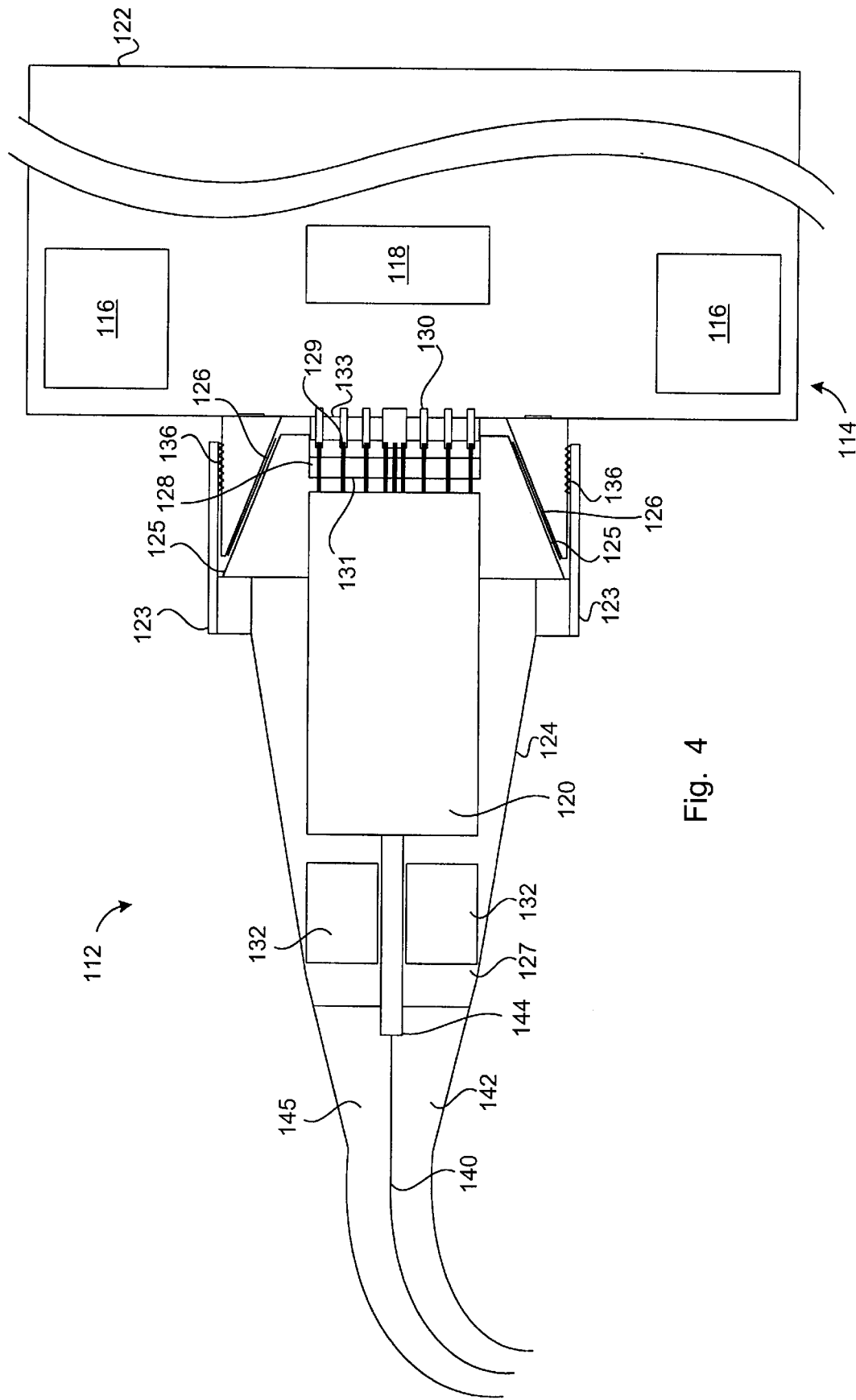
FIG. 4 is a top view of one embodiment of the modular electronic system of the present invention showing the small module of FIG. 3 connected to a large module.

FIG. 4 is a top view of one embodiment of the modular electronic system of the present invention showing small module 112 connected to large module 114. Large module 114 has non-permeable walls 122 and permeable wall portion 133 defining an enclosure holding at least one electronic component 118, and absorber 116. Non-permeable walls 122 have a high resistance to diffusion, whereas permeable wall portion 133 has a relatively lower resistance to diffusion.

Large module 114 contains a sufficient quantity of absorber 116 to control the absolute levels of contamination within both modules 112, 114 for the intended operating lifespan of the modules. A connector 130 coupled to electronic component 118 projects out of permeable wall portion 133 of large module 114. Connector 130 may be an electrical or optical connector, depending on the type of electronic components contained in large module 114 and small module 112.

In operation, small module 112 would be mated with large module 114 by means of tapered clamping receptacle 136 extending from a large module 114 having threads to engage locking nut 123 in an interference fit, thereby surrounding permeable wall portion 133. Connector 130 extending from large module 114 is used to form an electrical connection with connection pins 129.

The purpose of the physical arrangement shown in FIG. 4 is to ensure the reliable isolation of connectors 128, 130 and permeable walls 131, 133 from contaminants diffusing through tapered interface 125, tapered clamping receptacle 136 and sealant material 126. In this respect, tapered interface 125 and tapered clamping receptacle 136 must have adequate wall thickness and mechanical features to resist deformation when locking nut 123 or other storage device is fastened to either tapered interface 125 or tapered clamping receptacle 136 separately, or when tapered interface 125 and tapered clamping receptacle 136 are mated together. Unacceptable deformation of tapered interface 125 and/or tapered clamping receptacle 136 would cause warping to a point where contact pressure clamping the sealant material 126 would be released or would create voids in the tapered interface 125 and tapered clamping receptacle 136, both of which would reduce the quality of the contaminant permeation resistance and reduce the life of modules 112, 114. Other unacceptable deformation of sealant 125 and tapered clamping receptacle 136 could include permanent indenting of the tapered mating surfaces either locally from grit particles or generally from torsion of the taper from friction torque transmitted from locking nut 123.

Locking nut 123 and mating threads on tapered clamping receptacle 136 must be able to be fastened to each other without damage that would prevent them from being released upon maintenance activities and re-fastened to each other at a later time to provide adequate clamping pressure across tapered interface 125, tapered clamping receptacle 136 and sealant material 126 as previously described. When the tapered surfaces are mutually mated in typical environments, grit may be present. Therefore, sealant material 126 should be of adequate thickness with material properties as not to prevent the tapers from making an airtight seal after the tapers have been wiped off with a cloth or similar cleaning device.

On the one hand, the permeability of permeable walls 131, 133 is high enough that moisture and/or other specified environmental contaminants can easily be transmitted from small module 112 to large module 114 where it can be absorbed by absorbent 116, thus controlling the absolute moisture and/or contaminant levels within the small module 112. On the other hand, the permeability of permeable walls 131 is low enough that the small amount of absorber 132 within small module 112 can protect electrical component 120 for the period of time before connection to large module 114. By fitting small module 112 and large module 114 with non-permeable walls 131, 133 of desired permeability, the lifespan of electronic component 120 inside small module 112 can be increased.

An important feature of permeable walls 131, 133 in their connection to impermeable walls 122, 124 respectively. This connection must be airtight and continuous by the use of suitable adhesives and manufacturing cleanliness procedures and designed such as to prevent deflection of permeable walls 131, 133 away from impermeable walls 122, 124 which might cause a reduction in contact pressure between walls 122, 133 and walls 124, 131 over the lifetimes of modules 112, 114. The same principles apply to all conductors and interfaces in the connectors 128, 130. Deformation and void formation of polymeric materials by creep is a well-known phenomena. Loading of polymeric material can cause creep. Such loads might be induced by the force required to interconnect connectors 128, 130. Displacement of the interfaces between walls 122, 133 and walls 124, 131 during such connector insertions and withdrawals must also be prevented by suitable mechanical features designed into all four walls 122, 124, 131, and 133.

Figure 5:
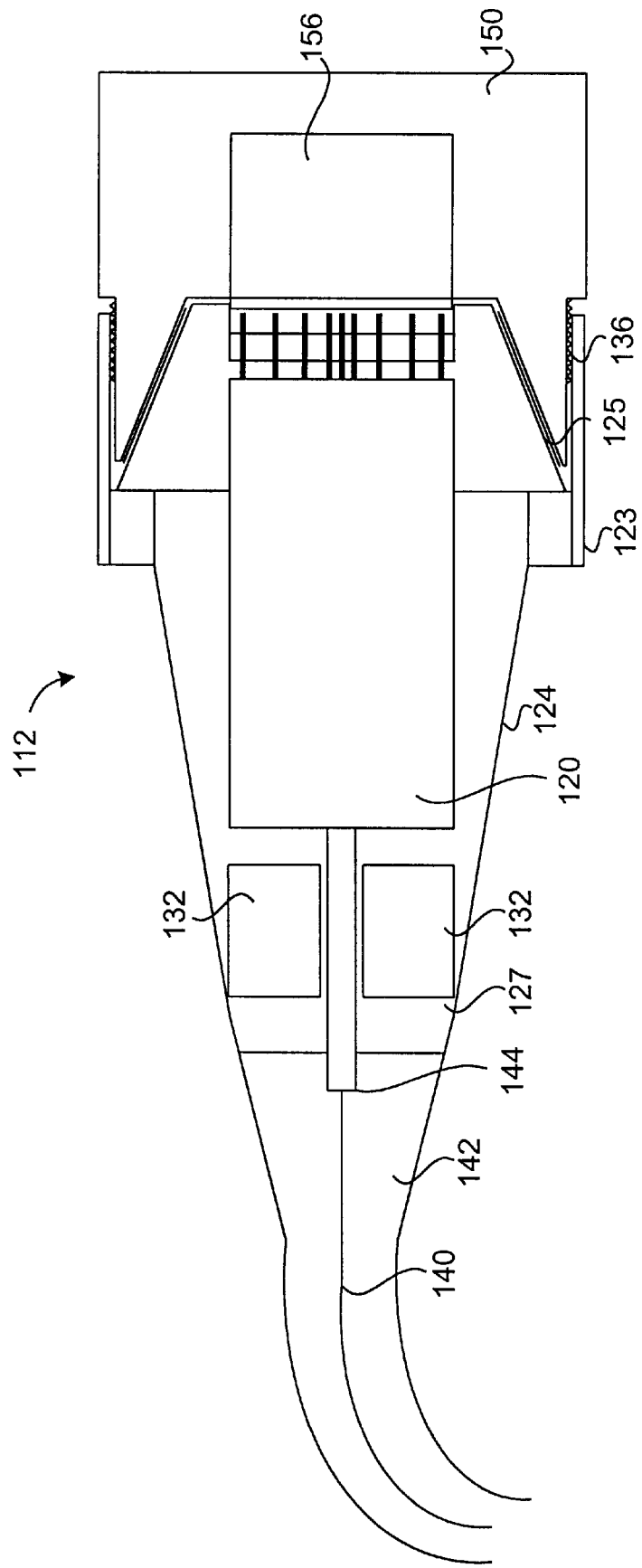
FIG. 5 is a top view of one embodiment of the small module of Figure in combination with a storage and shipping cap.

FIG. 5 is a top view of one embodiment of small module 112 that forms part of the modular electronic system of the present invention in combination with a storage and shipping cap 150. Storage and shipping cap 150 would be mated with small module 112 by means of threaded nut 123. Storage and shipping cap 150 contains a sufficient quantity of absorber 156 to prolong the lifespan of small module 112 for an extended period of time prior to assembly with large module 114. Moisture and/or other specified environmental contaminants are transmitted from small module 112 and through seal 126 to storage and shipping cap 150 where it can be absorbed by absorbent 156. The primary source of moisture and/or other specified environmental contaminants will diffuse through seal 126 from the external atmosphere, while smaller amounts will diffuse through small module 122 from feed-through 144.

The above description of a preferred embodiment should not be interpreted in any limiting manner since variations and refinements can be made without departing from the spirit of the invention. The scope of the invention is defined by the appended claims and their equivalents.

We claim:

1. A modular electronic system comprising:

a relatively large module having walls defining an enclosure holding at least one first electronic component and contaminant absorber for absorbing a specific environmental contaminant, a major portion of the walls being formed of material which is non-permeable to the specific environmental contaminant, and a minor portion being formed of material which is permeable to the specific environmental contaminant;

a first connector coupled to the at least one first electronic component and projecting out of the permeable wall portion of the relatively large module;

a relatively small module having walls defining an enclosure holding at least one second electronic component, a major portion of the walls being formed of material which is non-permeable to the specific environmental contaminant, and a minor portion being formed of material which is permeable to the specific environmental contaminant;

a second connector coupled to the at least one second electronic component and projecting out of the permeable wall portion of the relatively small module, the second connector being mateable with the first connector; and non-permeable sealant means providing a bridging seal between the non-permeable wall portion of the relatively small module and the non-permeable wall portion of the relatively large module in the vicinity of the first and second connectors when mutually mated, whereby the contaminant absorber in the relatively large module removes the specific environmental contaminant from the relatively small module via the permeable wall portions of the relatively large and relatively small modules.

2. The modular electronic system of claim 1 wherein the permeability of the permeable wall portion of the relatively small module is low enough such that the electronic component contained in the relatively small module is protected from the specific environmental contaminant for the period of time prior to connection to the relatively large module, but high enough such that the specific environmental contaminant can be transmitted from the enclosure of the relatively small module to the enclosure of the relatively large module within a specified time period.

3. The modular electronic system of claim 1 wherein the relatively small module contains a predetermined quantity of absorber to protect the electronic component contained in the relatively small module for the limited period of time prior to connection to the relatively large module.

4. The modular electronic system of claim 1 wherein the absorber contained in the relatively large module comprises molecular sieves.

5. The modular electronic system of claim 1 wherein the non-permeable material forming a major portion of the walls of the relatively small module and the relatively large module are made of a material selected from one of metal casting and metal/plastic laminate.

6. The modular electronic system of claim 2 wherein the permeable material forming a minor portion of the walls of the relatively small module and the relatively large module are made of a material selected from one of polycarbonate and PBT polyester.

7. The modular electronic system of claim 2 wherein the relatively small module contains absorber.

8. The modular electronic system of claim 2 wherein the absorber contained in the relatively large module comprises molecular sieves.

9. The modular electronic system of claim 2 wherein the non-permeable material forming a major portion of the walls of the relatively small module and the relatively large module are made of a material selected from one of metal casting and metal/plastic laminate.

10. The modular electronic system of claim 1 wherein a wall of said relatively small module has a cable opening sized to receive a cable, said cable being insertable in said cable opening and connectable to said electronic component contained in the relatively small module.

11. The modular electronic system of claim 10 wherein non-permeable sealant is disposed adjacent to said cable opening to prevent the specific environmental contaminant from entering said relatively small module.

12. The modular electronic system of claim 2 wherein a wall of said relatively small module has a cable opening sized to receive a cable, said cable being insertable in said cable opening and connectable to said electronic component contained within the relatively small module.

13. The modular electronic system of claim 12 wherein sealant is disposed adjacent to said cable opening to prevent the specific environmental contaminant from said entering said relatively small module.

14. The modular electronic system of claim 1 wherein an external junction is provided on the relatively large module, the external junction being defined by walls being formed of material which is non-permeable to the specific contaminant, surrounding the permeable wall portion and projecting outwardly from the relatively large module to receive a portion of the relatively small module including the permeable wall portion of the relatively small module, the non-permeable sealant means being located between the external junction and the received portion of the relatively small module.

15. The modular electronic system of claim 14 wherein said external junction is a tapered clamping receptacle, and the received portion of the relatively small module is a conical interface for mutual mating and unmating with said tapered clamping receptacle.

16. The modular electronic system of claim 14 wherein said external junction and said received portion of the relatively small module are clamped together by means of a clamp.

17. The modular electronic system of claim 16 wherein said clamp is a threaded nut carried by the relatively small module for engaging with an external thread on the tapered clamping receptacle.

18. The modular electronic system of claim 14 wherein said non-permeable sealant means is disposed on the mating surfaces between the external junction and the received portion of the relatively small module.

19. The modular electronic system of claim 1 wherein said specified environmental contaminant is water vapour.

20. The modular electronic system of claim 15 wherein said external junction and said received portion of the relatively small module are clamped together by means of a clamp.

21. The modular electronic system of claim 20 wherein said clamp is a threaded nut carried by the relatively small module for engaging with an external thread on the tapered clamping receptacle.

22. The modular electronic system of claim 21 wherein said non-permeable sealant means is disposed on the mating surfaces between the external junction and the received portion of the relatively small module.

* * * * *